(12) United States Patent
Qian et al.

(10) Patent No.: US 11,004,448 B2
(45) Date of Patent: May 11, 2021

(54) METHOD AND DEVICE FOR RECOGNIZING TEXT SEGMENTATION POSITION

(71) Applicant: BAIDU ONLINE NETWORK TECHNOLOGY (BEIJING) CO., LTD., Beijing (CN)

(72) Inventors: Sheng Qian, Beijing (CN); Qiang Cheng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 154 days.

(21) Appl. No.: 16/013,167

(22) Filed: Jun. 20, 2018

(65) Prior Publication Data
US 2019/0080683 A1 Mar. 14, 2019

(30) Foreign Application Priority Data
Sep. 11, 2017 (CN) .......................... 201710810545.2

(51) Int. Cl.
*G10L 15/05* (2013.01)
*G10L 15/16* (2006.01)
(Continued)

(52) U.S. Cl.
CPC .............. *G10L 15/22* (2013.01); *G10L 15/04* (2013.01); *G10L 15/16* (2013.01);
(Continued)

(58) Field of Classification Search
CPC ......... G10L 15/04; G10L 15/05; G10L 15/16; G10L 15/1815; G10L 15/183; G10L 15/19
(Continued)

(56) References Cited

U.S. PATENT DOCUMENTS 4,882,757 A * 11/1989 Fisher ................... G10L 15/193
704/253
5,457,768 A * 10/1995 Tsuboi .................... G10L 15/18
704/231
(Continued)

FOREIGN PATENT DOCUMENTS

| CN | 104142915 | 11/2014 |
| CN | 105609107 | 5/2016 |

OTHER PUBLICATIONS

SIPO, First Office Action for CN Application No. 201710810545.2, dated May 27, 2020.

*Primary Examiner* — Martin Lerner
(74) *Attorney, Agent, or Firm* — Hodgson Russ LLP (57) ABSTRACT

The present disclosure provides a method and a device for recognizing a text segmentation position. The method includes: receiving a continuous voice message inputted by a user, and recognizing the continuous voice message to generate a text message corresponding to the continuous voice message; analyzing the text message to determine an interval position, and sequentially inserting a sentence end and sentence begin sign at each interval position; calculating a segmentation value corresponding to the sentence end and sentence begin sign inserted at a present interval position according to a preset algorithm; and determining whether the segmentation value is greater than a preset threshold, and determining the present interval position as a segmentation position when the segmentation value is greater than the preset threshold.

6 Claims, 3 Drawing Sheets

(51) Int. Cl.
  *G10L 15/22* (2006.01)
  *G10L 15/04* (2013.01)
  *G10L 15/18* (2013.01)
  *G10L 25/51* (2013.01)
  *G10L 15/08* (2006.01)

(52) U.S. Cl.
  CPC .......... *G10L 15/1815* (2013.01); *G10L 25/51* (2013.01); *G10L 15/05* (2013.01); *G10L 2015/088* (2013.01)

(58) Field of Classification Search
  USPC ................ 704/231, 232, 235, 251, 253, 254
  See application file for complete search history.

(56) References Cited

U.S. PATENT DOCUMENTS

| | | | |
|---|---|---|---|
| 5,479,563 A * | 12/1995 | Yamaguchi | G10L 15/05 704/232 |
| 6,067,514 A * | 5/2000 | Chen | G10L 15/18 704/235 |
| 9,135,231 B1 * | 9/2015 | Barra | G10L 15/00 |
| 10,096,315 B2 * | 10/2018 | Kuo | G10L 15/05 |
| 10,714,087 B2 * | 7/2020 | Gill | G10L 15/05 |
| 2002/0198697 A1 | 12/2002 | Datig | |
| 2004/0138881 A1 * | 7/2004 | Divay | G10L 15/1807 704/231 |
| 2008/0255824 A1 * | 10/2008 | Aso | G10L 15/26 704/2 |
| 2010/0241429 A1 * | 9/2010 | Siminoff | G10L 15/265 704/235 |
| 2014/0350918 A1 * | 11/2014 | Liu | G10L 15/04 704/9 |
| 2014/0350939 A1 * | 11/2014 | Liu | G10L 15/265 704/257 |
| 2016/0026618 A1 * | 1/2016 | Bangalore | G10L 15/05 704/253 |
| 2016/0275940 A1 * | 9/2016 | Kurata | G10L 15/187 |
| 2016/0283841 A1 * | 9/2016 | Sainath | G10L 15/16 |
| 2016/0379632 A1 * | 12/2016 | Hoffmeister | G10L 15/18 704/253 |
| 2017/0287469 A1 * | 10/2017 | Kuo | G10L 15/05 |
| 2017/0372693 A1 * | 12/2017 | Rangarajan Sridhar | G10L 15/04 |
| 2019/0043486 A1 * | 2/2019 | Salloum | G10L 15/16 |
| 2019/0311709 A1 * | 10/2019 | Pappu | G10L 15/05 |

* cited by examiner

METHOD AND DEVICE FOR RECOGNIZING TEXT SEGMENTATION POSITION

CROSS REFERENCE TO RELATED APPLICATION

This application is based on and claims a priority to Chinese Patent Application No. 201710810545.2, filed with the Status Intellectual Property Office of P. R. China on Sep. 11, 2017, the entire contents of which are incorporated herein by reference.

FIELD

The present disclosure relates to the field of voice processing technology, and more particularly to a method and a device for recognizing a text segmentation position.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field refer to robots, speech recognition, image recognition, natural language processing, expert systems, etc. An important aspect of artificial intelligence is speech recognition technology.

In the related art, when continuous voice inputted by the user is recognized, a segmentation position in the input voice message is recognized according to the pause time of the user, and then a corresponding punctuation set in the segmentation position. However, user's speech speed and input scene may vary. Therefore, there are omissions or errors in recognizing segmentation position only based on the pause time of voice input, and accuracy of segmentation position recognition is reduced.

SUMMARY

Embodiments of the present disclosure provide a method for recognizing a text segmentation position. The method includes: receiving a continuous voice message inputted by a user, and recognizing the continuous voice message to generate a text message corresponding to the continuous voice message; analyzing the text message to determine an interval position, and sequentially inserting a sentence end and sentence begin sign at each interval position; calculating a segmentation value corresponding to the sentence end and sentence begin sign inserted at a present interval position according to a preset algorithm; and determining whether the segmentation value is greater than a preset threshold, and determining the present interval position as a segmentation position when the segmentation value is greater than the preset threshold.

Embodiments of the present disclosure provide a device for recognizing a text segmentation position, including: a generating module, configured to receive a continuous voice message inputted by a user, and recognize the continuous voice message to generate a text message corresponding to the continuous voice message; an analyzing module, configured to analyze the text message to determine an interval position, and sequentially insert a sentence end and sentence begin sign at each interval position; a calculating module, configured to calculate a segmentation value corresponding to the sentence end and sentence begin sign inserted at a present interval position according to a preset algorithm; and a determining module, configured to determine whether the segmentation value is greater than a preset threshold, and determine the present interval position as a segmentation position when the segmentation value is greater than the preset threshold.

Embodiments of the present disclosure provide a computer device, including: a memory, a processor and computer programs stored in the memory and executable by the processor. When the processor executes the computer programs, the method for recognizing a text segmentation position described in the above embodiments is performed.

Embodiments of the present disclosure provide a non-transitory computer readable storage medium, having instructions stored therein. When the instructions are executed by a processor, the method for recognizing a text segmentation position described in the above embodiments is performed.

Embodiments of the present disclosure provide a computer program product. When instructions in the computer program product are executed by a processor, the method for recognizing a text segmentation position described in the above embodiments is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will now be made in detail to exemplary embodiments, examples of which are illustrated in the accompanying drawings, in which the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and the device for recognizing a text segmentation position according to embodiments of the present disclosure will be described below with reference to drawings as follows.

As analyzed above, in practical applications, the speech speed and the input scene of the user may vary. Therefore, in the related art, there may be omissions or errors in recognizing segmentation positions only based on pause time of voice input, and accuracy of segmentation position recognition is reduced.

In order to solve the above technical problems, the present disclosure provides a method for recognizing a text segmentation position, which can segment sentences and display punctuations according to the user's intention, avoid misrecognition of segmentation positions caused by user's erroneous pause or fast speech speed, and improve accuracy of segmentation position recognition.

Figure 1:
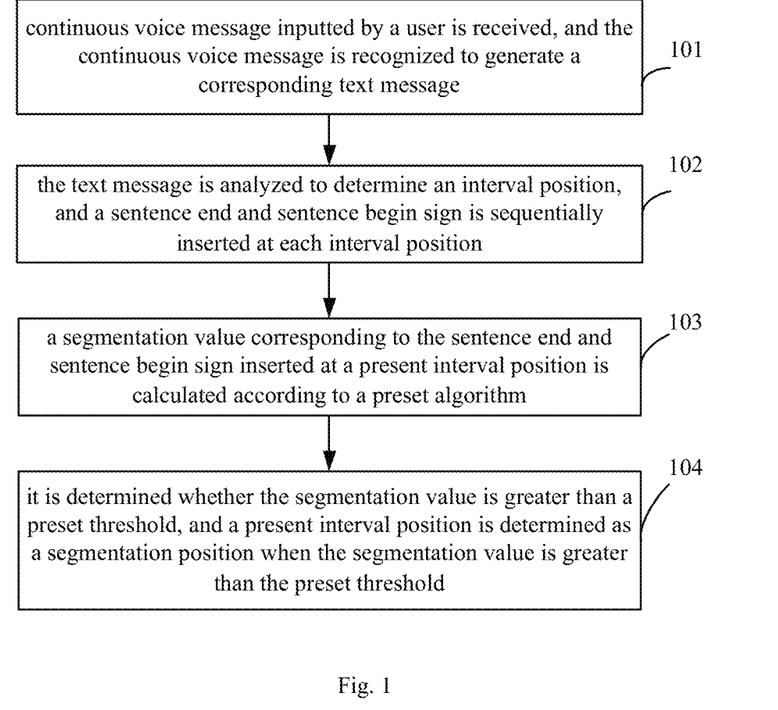
FIG. 1 is a flow chart of a method for recognizing a text segmentation position according to an embodiment of the present disclosure.

FIG. 1 is a flow chart of a method for recognizing a text segmentation position according to an embodiment of the present disclosure. As illustrated in FIG. 1, the method includes followings.

At block 101, continuous voice message inputted by a user is received, and the continuous voice message is recognized to generate a corresponding text message.

In embodiments of the present disclosure, according to different application scenarios, the way of receiving the continuous voice message inputted by the user may vary. As a possible implementation, the continuous voice message may be received in real time through a voice device such as a microphone in the terminal device. As another possible implementation, the continuous voice message may also be extracted from user's recording according to the user's selection.

In detail, in embodiments of the present disclosure, the continuous voice message inputted by the user is received, and the continuous voice message is recognized to generate the text message corresponding to the continuous voice message, so as to facilitate word segmentation processing on the continuous voice message.

It should be noted that, implementations of recognizing the continuous voice message to generate the text message corresponding to the continuous voice message may vary according to different application scenarios. As a possible implementation, text messages corresponding to different voice may be established and stored in advance according to a large amount of experimental data. Thus, after the continuous voice message inputted by the user is acquired, the continuous voice message can be matched with the prestored voice, and text messages corresponding to the matched voice can be acquired.

As another possible implementation, the text message may be converted using a convolutional neural network model set in advance based on experimental data. In an embodiment, the continuous voice message inputted by the user is input into a preset convolutional neural network model, and the text message corresponding to the continuous voice message is obtained according to the output of the convolutional neural network model.

At block 102, the text message is analyzed to determine an interval position, and a sentence end and sentence begin sign is sequentially inserted at each interval position.

According to different application scenarios, the sentence end and sentence begin sign may be a special character, such as "*", "#", etc., and may also be a special code, such as "00", or "01", which is not limited herein.

It should be noted that, according to different application scenarios, the way of analyzing the text message to determine the interval position and sequentially inserting the sentence end and sentence begin sign at each interval position may vary, examples are as follows.

Figure 2:
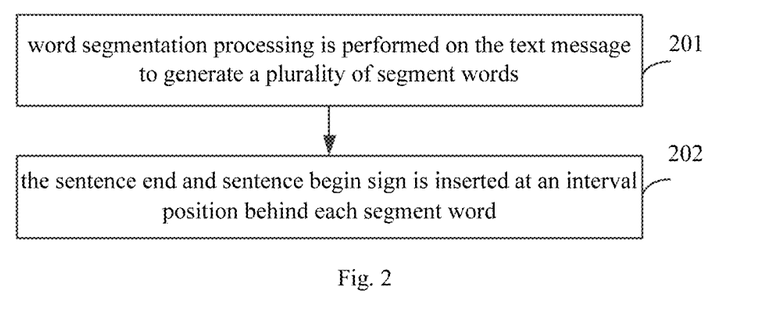
FIG. 2 is a flow chart of a method for recognizing a text segmentation position according to another embodiment of the present disclosure.

As a possible implementation, as illustrated in FIG. 2, block 102 may include followings.

At block 201, word segmentation processing is performed on the text message to generate a plurality of segment words.

In detail, the word segmentation processing may be performed on the text message according to part of speech of the text, to generate a plurality of segment words.

At block 202, the sentence end and sentence begin sign is inserted at an interval position behind each segment word.

In detail, since the segment word is usually a fixed word, such as " 降落伞 " (Chinese characters, i.e., "parachute"), the segment word is usually continuous. Therefore, the segmentation position should be between different segmentation words. Thus, in this embodiment, the sentence end and sentence begin sign is inserted at the interval position behind each segment word.

For example, when the sentence end and sentence begin sign is "*", word segmentation processing is performed on a text message "我想要一个降落伞" (Chinese characters, i.e., "I want to have a parachute"), and a plurality of segment words of "我 (I)", "想 (want to)", "要 (have)", "一个 (a)", and " 降落伞 (parachute)" are generated, after the sentence end and sentence begin sign is inserted at the interval position behind each segment word, the result may be *"我 (I)"*"想 (want to)"*"要 (have)"*" 一个 (a)"*" 降落伞 (parachute)"*.

Figure 3:
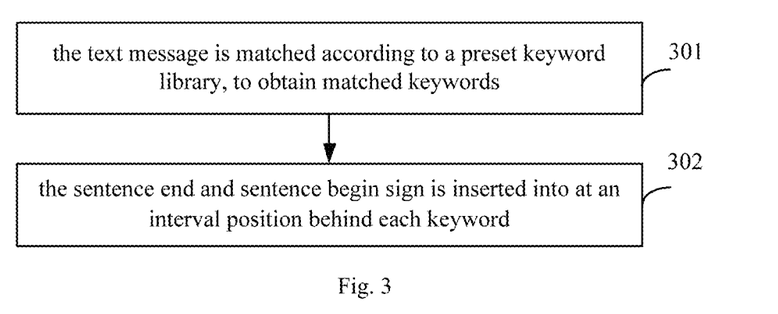
FIG. 3 is a flow chart of a method for recognizing a text segmentation position according to yet another embodiment of the present disclosure.

As a possible implementation, as illustrated in FIG. 3, block 102 may include followings.

At block 301, the text message is matched according to a preset keyword library, to obtain matched keywords.

It can be understood that, in embodiments of the present disclosure, the preset keywords may be words that users are used to continuously pronouncing, and may be obtained based on a large amount of experimental data. The preset keywords may be learned based on user's personal speaking habits, or may be learned based on big data such as online buzzwords. The preset keywords may be different from continuous words in the related art.

In detail, in the embodiment, after the continuous voice message is recognized and the text message corresponding to the continuous voice message is generated, the text message may be matched according to a preset keyword library to obtain the matched keywords.

At block 302, the sentence end and sentence begin sign is inserted at an interval position behind each keyword.

For example, when the sentence end and sentence begin sign is "*", keyword matching is performed on a text message "我想要一个降落伞" (Chinese characters, i.e., "I want to have a parachute"), the matched keywords may include " 一个 (a)" and " 降落伞 (parachute)", and after the sentence end and sentence begin sign is inserted at the interval position behind each keyword, the result may be *"我想要(i want to have)"*" 一个 (a)"*" 降落伞 (parachute)"*.

At block 103, a segmentation value corresponding to the sentence end and sentence begin sign inserted at a present interval position is calculated according to a preset algorithm.

It can be understood that, after the sentence end and sentence begin sign is sequentially inserted at each interval position, segmentation corresponding to the interval position may not be consistent with the user's intention. Therefore, it is necessary to calculate a segmentation value corresponding to the sentence end and sentence begin sign inserted at the present interval position according to a preset algorithm, so as to determine the segmentation position that matches user's speaking habits according to the segmentation value.

According to different application scenarios, the preset algorithm may vary, examples are as follows.

Figure 4:
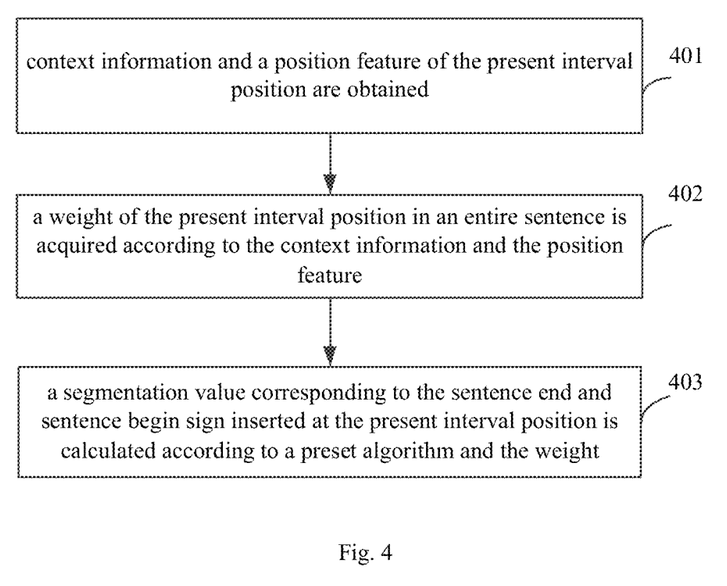
FIG. 4 is a flow chart of a method for recognizing a text segmentation position according to yet another embodiment of the present disclosure.

As a possible implementation, as illustrated in FIG. 4, block 103 may include followings.

At block 401, context information and a position feature of the present interval position are obtained.

The context information may include content information, length information, part-of-speech information, and the like in the context. The position feature may include part-of-speech position feature (such as "between adjective and preposition", "between preposition and adjective", etc.), segmentation word position information (such as "first 5 words", "last 3 words", etc.), pause time information (such as pause for 2 seconds, etc.), and the like.

At block 402, a weight of the present interval position in an entire sentence is acquired according to the context information and the position feature.

In detail, since context information and the position feature are related to the segmentation position, influences of different context information and position features on the segmentation position may vary. Therefore, the weight of the present interval position in the entire sentence can be acquired by analyzing the context information and the position feature.

For example, for a reference standard in the context information, a connection tight relationship (for example, a connection relationship between adjectives and adjectives is weaker than that between subject and preposition) has a close relationship with the segmentation position, and thus the weight corresponding to the connection tight relationship is large. For a reference standard in the position feature, pause interval duration has a close relationship with the segmentation position, and thus the weight corresponding to the pause interval duration is large.

In this example, the position feature of the sentence reflects user's personal speaking habits, such as the position and length of pause interval. Therefore, segmentation based on the position feature can meet user's personal needs.

At block 403, a segmentation value corresponding to the sentence end and sentence begin sign inserted at the present interval position is calculated according to a preset algorithm and the weight.

It can be understood that, in embodiments of the present disclosure, the preset algorithm corresponding to the weight can be set in advance, and the segmentation value corresponding to the sentence end and sentence begin sign inserted at the present interval position can be calculated according to the preset algorithm and the weight. The greater the segmentation value is, the more likely it is the segmentation position.

The preset algorithm may vary according to different application scenarios, as a possible implementation, the preset algorithm may be the sum of products between multiple weights corresponding to multiple reference standards and their respective values at the present interval position. For example, for the present position, the weight corresponding to a context reference standard 1 is a1, the value is b1, the weight corresponding to a context reference standard 2 is a2, the value is b2, the weight corresponding to a position feature reference standard 1 is a3, the value is b3, and then the segmentation value of the present position is $S=a1*b1+a2*b2+a3*b3$.

At block 104, it is determined whether the segmentation value is greater than a preset threshold, and a present interval position is determined as a segmentation position when the segmentation value is greater than the preset threshold.

The preset threshold may be a reference value calibrated according to experimental data. When the segmentation value is greater than the preset threshold, the present interval position is determined as the segmentation position.

In an embodiment of the present disclosure, in order to clearly illustrate the segmentation position, a corresponding punctuation can be displayed at the segmentation position according to context information of the present interval position. For example, according to the context information, when parts of speech of words before and after segmentation position are adjectives, it may be determined that the punctuation displayed at the segmentation position is a pause mark.

As described above, with the method for recognizing a text segmentation position provided in embodiments of the present disclosure, a continuous voice message inputted by the user is received, the continuous voice message is recognized to generate a text message corresponding to the continuous voice message, the text message is analyzed to determine an interval position, and a sentence end and sentence begin sign is inserted at each interval position, a segmentation value corresponding to the sentence end and sentence begin sign inserted at a present interval position is calculated according to a preset algorithm, it is determined whether the segmentation value is greater than a preset threshold, and the present interval position is determined as the segmentation position when the segmentation value is greater than the preset threshold. Thus, sentences can be segmented according to user's personal intention, misrecognition of segmentation positions caused by user's erroneous pause or fast speech speed can be avoided, and accuracy of segmentation of user input voice can be improved, such that accuracy of speech recognition is improved.

Figure 5:
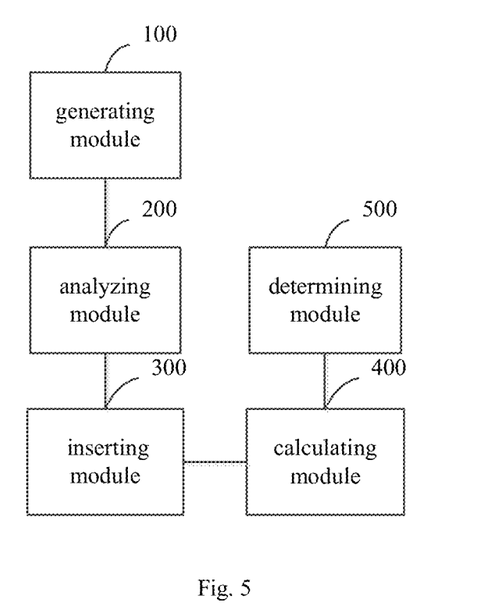
FIG. 5 is a block diagram of a device for recognizing a text segmentation position according to an embodiment of the present disclosure.

In order to implement the above embodiments, the present disclosure further provides a device for recognizing a text segmentation position. FIG. 5 is a block diagram of a device for recognizing a text segmentation position according to an embodiment of the present disclosure. As illustrated in FIG. 5, the device includes a generating module 100, an analyzing module 200, an inserting module 300, a calculating module 400 and a determining module 500.

The generating module 100 is configured to receive a continuous voice message inputted by a user, and recognize the continuous voice message to generate a text message corresponding to the continuous voice message.

The analyzing module 200 is configured to analyze the text message to determine an interval position.

The inserting module 300 is configured to sequentially insert a sentence end and sentence begin sign at each interval position.

The calculating module 400 is configured to calculate a segmentation value corresponding to the sentence end and sentence begin sign inserted at a present interval position according to a preset algorithm.

Figure 6:
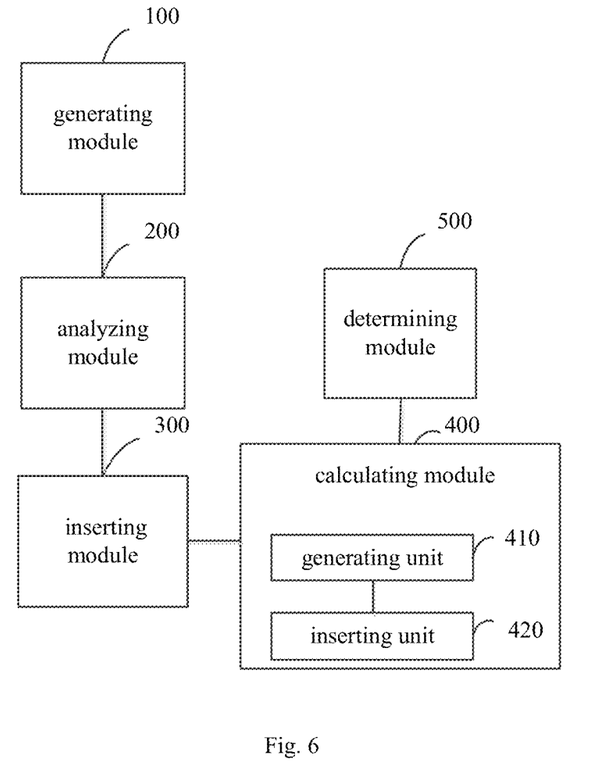
FIG. 6 is a block diagram of a device for recognizing a text segmentation position according to another embodiment of the present disclosure.

In an embodiment of the present disclosure, as illustrated in FIG. 6, and on the basis of FIG. 5, the calculating module 400 includes a generating unit 410 and an inserting unit 420.

The generating unit 410 is configured to perform word segmentation processing on the text message to generate a plurality of segment words.

The inserting unit 420 is configured to insert the sentence end and sentence begin sign at the interval position behind each segment word.

The determining module 500 is configured to determine whether the segmentation value is greater than a preset threshold, and determine the present interval position as a segmentation position when the segmentation value is greater than the preset threshold.

It should be noted that, descriptions and explanations of embodiments of the method for recognizing a text segmentation position are also suitable for embodiments of the device for recognizing a text segmentation position, and details will not be described herein again.

As described above, with the device for recognizing a text segmentation position provided in embodiments of the present disclosure, a continuous voice message inputted by the user is received, the continuous voice message is recognized to generate a text message corresponding to the continuous voice message, the text message is analyzed to determine an interval position, and a sentence end and sentence begin sign is inserted at each interval position, a segmentation value corresponding to the sentence end and sentence begin sign inserted at a present interval position is calculated according to a preset algorithm, it is determined whether the segmentation value is greater than a preset threshold, and the present interval position is determined as the segmentation position when the segmentation value is greater than the preset threshold. Thus, sentences can be segmented according to user's personal intention, misrecognition of segmentation positions caused by user's erroneous pause or fast speech speed can be avoided, and accuracy of segmentation of user input voice can be improved, such that accuracy of speech recognition is improved.

Figure 7:
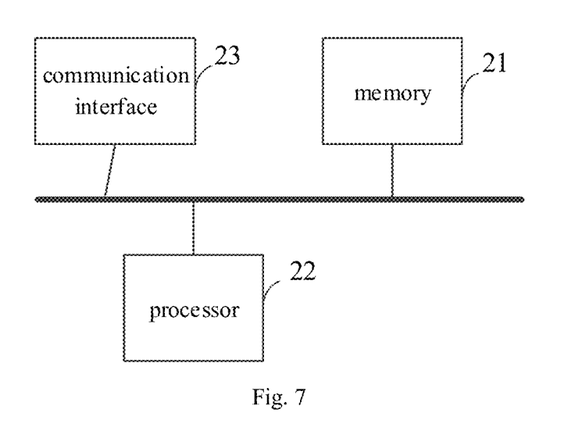
FIG. 7 is a block diagram of a computer device according to an embodiment of the present disclosure.

In order to implement the above embodiments, the present disclosure also provides a computer device. FIG. 7 is a block diagram of a computer device according to an embodiment of the present disclosure. As illustrated in FIG. 7, the computer device includes a memory 21, a processor 22 and computer programs stored in the memory 21 and executable by the processor 22.

When the processor 22 executes the programs, the method for recognizing a text segmentation position provided in the above embodiments is implemented.

In addition, the computer device further includes a communication interface 23.

The communication interface 23 is configured for communication between the memory 21 and the processor 22.

The memory 21 is configured to store computer programs executable by the processor 22.

The memory 21 may include a high-speed RAM memory, and may also include a non-volatile memory, such as at least one magnetic disk memory.

When programs are executed by the processor 22, the processor 22 is caused to implement the method for recognizing a text segmentation position described in the above embodiments.

When the memory 21, the processor 22 and the communication interface 23 are independently implemented, the communication interface 23, the memory 21 and the processor 22 may be connected to each other and communicate with each other through a bus. The bus may be an industry standard architecture (ISA) bus, a peripheral component (PCI) bus, or an extended industry standard architecture (EISA) bus, etc. The bus may include an address bus, a data bus, a control bus, and the like. For ease of illustration, in FIG. 7, the bus is only illustrated in a bold line, but it does not mean that there is only one bus or one type of bus.

In at least one embodiment, in an implementation, when the memory 21, the processor 22 and the communication interface 23 are integrated on a chip, the memory 21, the processor 22 and the communication interface 23 may communicate with each other through an internal interface.

The processor 22 may be a central processing unit (CPU for short), an application specific integrated circuit (ASIC for short), or one or more integrated circuit configured to implement the embodiments of the present disclosure.

In order to implement the above embodiments, the present disclosure further provides a non-transitory computer readable storage medium, having instructions stored therein. When the instructions are executed by a processor, the method for recognizing a text segmentation position according to above embodiments is performed.

In order to implement the above embodiments, the present disclosure further provides a computer program product including instructions. When the instructions are executed by a processor, the method for recognizing a text segmentation position according to the above embodiments is performed.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, like two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for recognizing a text segmentation position, comprising:
   receiving a continuous voice message inputted by a user, and recognizing the continuous voice message to generate a text message corresponding to the continuous voice message;
   performing word segmentation processing on the text message to generate a plurality of segment words, wherein each of the plurality of segment words corresponds to one word in the text message, and sequentially inserting an end and begin sign at interval positions behind each of the plurality of segment words to obtain a first recognition result;
   acquiring context information and a position feature of each of the interval positions;
   acquiring a weight of each of the interval positions in the first recognition result according to the context information and the position feature of each of the interval positions;
   calculating a segmentation value corresponding to the end and begin sign inserted at each of the interval positions according to a preset algorithm and the weight of each of the interval positions, wherein the segmentation value is a value to which the end and begin sign is inserted at each of the interval positions;
   determining whether the segmentation value at each of the interval positions is greater than a preset threshold, determining at least one of the interval positions as a segmentation position when its segmentation value is greater than the preset threshold; and
   displaying a corresponding punctuation in place of the end and begin sign at the segmentation position according to context information of its interval position to obtain a second recognition result;
   wherein receiving the continuous voice message inputted by the user, and recognizing the continuous voice message to generate the text message corresponding to the continuous voice message comprises:
      inputting the continuous voice message into a preset convolutional neural network model; and
      acquiring the text message corresponding to the continuous voice message according to output of the convolutional neural network model;
   wherein sequentially inserting the end and begin sign at interval positions behind each of the plurality of segment words comprises:
      matching the text message according to a preset keyword library, to obtain matched keywords;
      inserting the end and begin sign at an interval position behind each matched keyword;
   wherein the position feature information of each of the interval positions comprises:
      a part-of-speech position feature, based on part-of-speech information of the segment words before and after each of the interval positions;
      segmentation word position information, based on each of the interval positions being within the first N words of the text message or the last M words of the text message; and
      pause time information, based on a pause time length at each of the interval positions.

2. The method according to claim 1, wherein receiving the continuous voice message inputted by the user further comprises:
   extracting a continuous voice message from a recording according to a user selection; and
   taking the continuous voice message from the recording as the continuous voice message inputted by the user.

3. A computer device, comprising:
   a memory;
   a processor;
   computer programs stored in the memory and executable by the processor;
   wherein, when the processor executes the computer programs, a method for recognizing a text segmentation position is performed, the method comprising:

receiving a continuous voice message inputted by a user, and recognizing the continuous voice message to generate a text message corresponding to the continuous voice message;

performing word segmentation processing on the text message to generate a plurality of segment words, wherein each of the plurality of segment words corresponds to one word in the text message, and sequentially inserting an end and begin sign at interval positions behind each of the plurality of segment words to obtain a first recognition result;

acquiring context information and a position feature of each of the interval positions;

acquiring a weight of each of the interval positions in the first recognition result according to the context information and the position feature of each of the interval positions;

calculating a segmentation value corresponding to the end and begin sign inserted at each of the interval positions according to a preset algorithm and the weight of each of the interval positions, wherein the segmentation value is a value to which the end and begin sign is inserted at each of the interval positions;

determining whether the segmentation value at each of the interval positions is greater than a preset threshold, determining at least one of the interval positions as a segmentation position when its segmentation value is greater than the preset threshold; and displaying a corresponding punctuation in place of the end and begin sign at the segmentation position according to context information of its interval position to obtain a second recognition result;

wherein receiving the continuous voice message inputted by the user, and recognizing the continuous voice message to generate the text message corresponding to the continuous voice message comprises:

inputting the continuous voice message into a preset convolutional neural network model; and acquiring the text message corresponding to the continuous voice message according to output of the convolutional neural network model;

wherein sequentially inserting the end and begin sign at interval positions behind each of the plurality of segment words comprises:

matching the text message according to a preset keyword library, to obtain matched keywords;

inserting the end and begin sign at an interval position behind each matched keyword;

wherein the position feature information of each of the interval positions comprises:

a part-of-speech position feature, based on part-of-speech information of the segment words before and after each of the interval positions;

segmentation word position information, based on each of the interval positions being within the first N words of the text message or the last M words of the text message; and pause time information, based on a pause time length at each of the interval positions.

4. The computer device according to claim 3, wherein receiving the continuous voice message inputted by the user further comprises:

extracting a continuous voice message from a recording according to a user selection; and taking the continuous voice message from the recording as the continuous voice message inputted by the user.

5. A non-transitory computer readable storage medium, configured to store computer programs, wherein when the computer programs are executed by a processor, a method for recognizing a text segmentation position is performed, the method comprising:

receiving a continuous voice message inputted by a user, and recognizing the continuous voice message to generate a text message corresponding to the continuous voice message;

performing word segmentation processing on the text message to generate a plurality of segment words, wherein each of the plurality of segment words corresponds to one word in the text message, and sequentially inserting an end and begin sign at interval positions behind each of the plurality of segment words to obtain a first recognition result;

acquiring context information and a position feature of each of the interval positions;

acquiring a weight of each of the interval positions in the first recognition result according to the context information and the position feature of each of the interval positions;

calculating a segmentation value corresponding to the end and begin sign inserted at each of the interval positions according to a preset algorithm and the weight of each of the interval positions, wherein the segmentation value is a value to which the end and begin sign is inserted at each of the interval positions;

determining whether the segmentation value at each of the interval positions is greater than a preset threshold, determining at least one of the interval positions as a segmentation position when its segmentation value is greater than the preset threshold; and displaying a corresponding punctuation in the place of the end and begin sign at the segmentation position according to context information of its interval position to obtain a second recognition result;

wherein receiving the continuous voice message inputted by the user, and recognizing the continuous voice message to generate the text message corresponding to the continuous voice message comprises:

inputting the continuous voice message into a preset convolutional neural network model; and acquiring the text message corresponding to the continuous voice message according to output of the convolutional neural network model;

wherein sequentially inserting the end and begin sign at interval positions behind each of the plurality of segment words comprises:

matching the text message according to a preset keyword library, to obtain matched keywords;

inserting the end and begin sign at an interval position behind each matched keyword;

wherein the position feature information of each of the interval positions comprises:

a part-of-speech position feature, based on part-of-speech information of the segment words before and after each of the interval positions;

segmentation word position information, based on each of the interval positions being within the first N words of the text message or the last M words of the text message; and pause time information, based on a pause time length at each of the interval positions.

6. The non-transitory computer readable storage medium according to claim 5, wherein receiving the continuous voice message inputted by the user further comprises:

extracting a continuous voice message from a recording according to a user selection; and taking the continuous voice message from the recording as the continuous voice message inputted by the user.

* * * * *